United States Patent [19]
Roberts

[11] 3,884,742
[45] May 20, 1975

[54] METHOD OF MAKING PLASTIC BOOK COVER

[75] Inventor: Alvin V. Roberts, Scarsdale, N.Y.

[73] Assignee: Bookwrights, Inc., Scarsdale, N.Y.

[22] Filed: Mar. 21, 1973

[21] Appl. No.: 343,017

[52] U.S. Cl. .................. 156/268; 11/2; 156/272; 156/274; 219/10.81
[51] Int. Cl. .......................................... B32b 31/20
[58] Field of Search .......... 156/257, 268, 272, 274, 156/500, 244; 219/10.41, 10.43, 10.53, 10.81; 281/29; 11/1 CP, 2

[56] References Cited
UNITED STATES PATENTS

| | | | |
|---|---|---|---|
| 2,579,488 | 12/1951 | Freeman | 156/272 |
| 2,631,646 | 3/1953 | Gannon et al. | 219/10.81 |
| 2,638,963 | 5/1953 | Frederick et al. | 219/10.81 |
| 2,734,982 | 2/1956 | Gillespie et al. | 219/10.81 |
| 3,168,424 | 2/1965 | Sendor | 156/500 |
| 3,668,028 | 6/1972 | Short | 156/272 |
| 3,790,744 | 2/1974 | Bowen | 156/272 |

FOREIGN PATENTS OR APPLICATIONS
1,192,643  5/1970  United Kingdom............. 219/10.81

*Primary Examiner*—Caleb Weston
*Attorney, Agent, or Firm*—Sandoe, Hopgood & Calimafde

[57] ABSTRACT

This method for controlling the depth, spacing and uniformity of hinge lines, when making plastic book covers, uses a laminated web or sheet. One component of the laminate is made of plastic material that is heated by exposure to a high frequency electric field and the other component of the laminate is a plastic which undergoes no consequential heating in the high frequency electric field. A tool applies pressure to the first laminate, when the first laminate is heated to a flowable temperature. The tool pressure displaces material of the first laminate down to, or close to, the interface where the laminates are bonded together; but the second laminate has substantially no change in thickness.

14 Claims, 11 Drawing Figures

3,884,742

METHOD OF MAKING PLASTIC BOOK COVER

BACKGROUND AND SUMMARY OF THE INVENTION

In the manufacture of plastic book covers, it is important to control the depth and uniformity of the hinge lines. To do this mechanically poses some problems:

1. To get all of the surfaces of a dielectric die in exactly the same plane requires skillful machining and maintenance.
2. To keep the aforementioned plane of the die and the plane of the bed plate of the press exactly parallel requires skillful set-up, continual checking and better than average (and therefore more expensive than average) equipment.

Uniformity of hinge lines can be more easily obtained by the method of this invention which uses a laminated material for the book covers with each component of the laminate different from the other. One component is responsive to electronic heating (also known as dielectric or radio-frequency or RF heating) and the other component has little or no response to the high frequency electric field.

Materials which are heated to a softened condition and then to a fused condition are commonly referred to as "dielectrically heat sealable." They can be sealed to a surface of the same material or to another heated material by being exposed to an alternating electromagnetic field of high frequency with the surfaces of the materia in contact with one another. Polyvinyl chloride (often referred to as PVC) is one of the best known dielectrically heat sealable materials.

Heat sealable plastics are suitable for this invention, but the invention only requires sufficient heat to soften the plastic to a flowable condition, so any material which can be dielectrically heated to a flowable condition is suitable for this invention even though it does not fuse. In fact, the preferred embodiment of the invention stops the heating when the material reaches a condition where it will flow under pressure but is not sufficiently hot to fuse or even to flow back into a groove from which it was displaced by pressure. For purposes of this invention plastic material that can be heated to a flowable condition by dielectric heating will be referred to as dielectrically heat sealable.

Book covers made in accordance with this invention are laminated. This means that the cover is made of at least two layers of plastic which are bonded together, preferably over the entire areas of their interface. One layer is made of heat sealable material and the other layer is made of plastic material that is less highly heated or not heated to any consequential extent by a high frequency electric field.

Theoretically, every material is probably heated to some extent by alternating electric magnetic field, since only a vacuum has perfect loss characteristics; but for purposes of this invention it is sufficient that the second layer be heated less than the first layer and that the second layer remain at a temperature so low that it does not soften up to undergo permanent displacement when subjected to the tool pressure that is used to displace the material along the hinge line of the first layer. For purposes of this specification, this lesser degree of heating of the second layer will be referred to as "inconsequential heating." Polypropylene is a well-known example of a plastic that undergoes only inconsequential heating in an alternating high frequency electromagnetic field.

The covers of this invention are preferably formed from a strip of laminate that moves continuously through a hinge forming station; and that is cut to form book covers at a shearing or cut-off station; but the invention can be used with batch operation when continuous facilities are not available. The laminates can be in the form of a web or sheet.

In addition to providing control of depth and uniformity of hinge lines, this invention has other advantages in making plastic book covers. For example, the laminate can be made by bonding together sheets of different colors in order to obtain unusual and decorative effects. Also, the laminated sheet can be fabricated with the layer that is not to be grooved made of more flexible material particularly well suited for repeated bending as a hinge, and the heat sealable layer can be made of less flexible material for imparting stiffness to the cover over areas other than the hinge lines. The material that does not have to provide the hinge areas can be made of less expensive plastic to reduce the total cost of the cover.

Another feature relates to the forming of hinge lines by means with adjustable spacing of the hinge lines so that the same apparatus can make covers for books of different thickness. Other means adjustable to cut the covers to different widths compensate for the wider or narrower spine area of the cover between the hinge lines.

Other objects, features and advantages of the invention will appear or be pointed out as the description proceeds.

BRIEF DESCRIPTION OF DRAWING

In the drawing, forming a part hereof, in which like reference characters indicate corresponding parts in all the views:

FIG. 9 showing the hinge lines on the outside of the book and FIG. 10 showing the hinge lines on the inside.

DESCRIPTION OF PREFERRED EMBODIMENT

Figure 1:
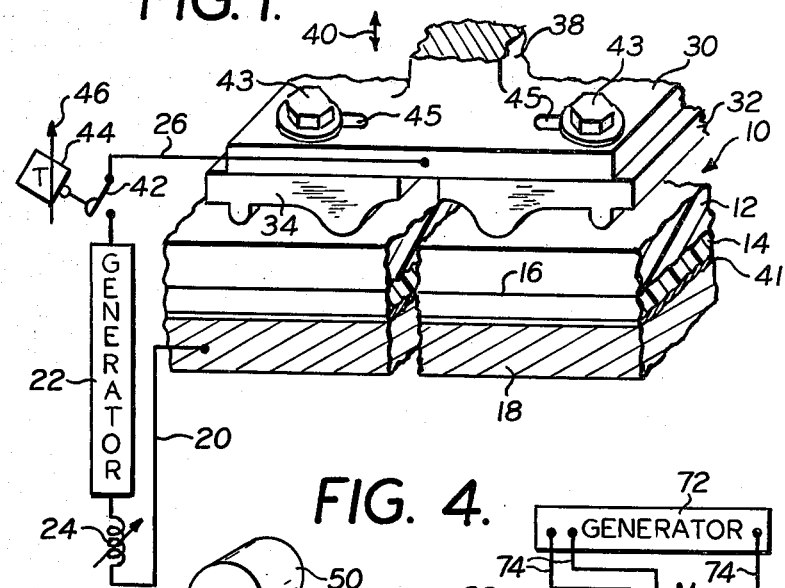
FIG. 1 is a diagrammatic view showing one kind of apparatus by which hinge lines can be formed in a laminated sheet which is to be cut into book covers.

FIG. 1 shows a laminated sheet 10 formed from a first laminate layer 12 and a second laminate layer 14. Both layers 12 and 14 are made of plastic and bonded together at an interface 16 at which the layers 12 and 14 are fusion bonded to one another in the preferred construction; but they can be secured together by adhesive. The laminate 10 rests on an underlying metal support 18 which comprises the lower electrode of a high frequency electric circuit.

The electrode 18 is connected by a conductor 20 with a high frequency generator 22 having means for adjusting the output and frequency of the generator. This adjustment means is shown diagrammatically by the adjustable element 24.

The other side of the high frequency generator 22 is connected by a conductor 26 with an upper electrode 30. Elongated pressure tools 32 and 34 are secured to the electrode 30 and constitute a part of the electrode 30. In the construction illustrated, the lower electrode 18 is stationary and the upper electrode 30, which is also made of metal, is attached to a ram 38 which moves up and down as indicated by the arrow 40. A switch 42 is located in series with the conductor 26 between the conductor and the generator 22 and this switch is closed whenever power is to be supplied to the electrodes 18 and 30. A buffer 41 covers the upper face of the electrode 18.

The tools 32 and 34 are shown connected with the electrode structure 30 by screws 43 extending through slots 45. This structure is a simplified representation of means for adjusting the tools 32 and 34 toward and from one another to change the spacing of hinge lines in accordance with the thickness of the book for which a cover is to be used.

Figure 2:
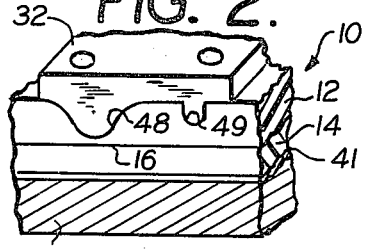
FIGS. 2 and 3 are diagrammatic views illustrating the way in which each of the tools of FIG. 1 is used to displace flowable material from the top layer of laminate to form a hinge line.

An adjustable timer 44 is set by the closing of the switch 42; and this timer operates to open the switch at a predetermined period which is adjustable as indicated by the arrow 46 of the timer 44. In the operation of the apparatus shown in FIG. 1, the tools 32 and 34 are placed in contact with the upper component 12; the switch 42 is closed; and as the plastic of the upper component 12 is heated, the tools 32 and 34 are brought down to displace plastic from the space under the tool and to form a groove 48, as shown in FIG. 2. In the illustrated construction, the tool forms a side groove 49 shown also in FIG. 9. The amount of heating is maintained uniform for successive operations by having the timer 44 (FIG. 1) open the switch 42 after a limited period of heating.

The amount of heat generated in the upper component 12 is sufficient to heat the plastic in the region of the tools 32 and 34 to a flowable condition so that plastic can be displaced to form the groove 48 (FIGS. 2 and 3) when subjected to the pressure of the tool 34 (and the other tool 32 for the other hinge line); but the plastic is not heated highly enough to flow back into the groove 48 when the tool 34 is withdrawn.

The tool 34 can penetrate all the way to the interface 16 if desired. This provides a hinge line groove 48 for the full depth of the component 12 and the hinge of the book cover is formed entirely by the lower component 14. In the preferred operation of the method of this invention, the penetration of the tool 34 to the interface 16 is the limit of penetration; because the lower laminate 14 has only inconsequential heating from the high frequency electric field and is not flowable under the pressure exerted by the tool 34. While it is true that the tool 34 absorbs some heat from the displaced portions of the upper component 12, the duration of contact of the tool 34 with the lower component 14 is too short; and the temperature of the tool too low; the temperature of the unexcited plastic of the lower component 14 also too low to cause an effective displacement in cases where the tool touches the lower component. Thus the maximum depth of the groove 48 is determined by the thickness of the dielectric heat sealable material of the upper component 12.

It is not essential that the groove 48 extend for the full depth of the upper component 12, but it is a feature of the preferred operation of the method of this invention to have the tool 34 penetrate the upper layer 12 to substantially the interface 16. When so operated, considerable tolerance in the parallelism of the tool 34 with the support 18 is permissible without substantially changing the uniformity and depth of the hinge groove because the lower layer 14 can compress to accommodate lack of parallelism without making the groove 48 deeper at the compressed area since the compressed material is only temporarily displaced by the tool.

The dielectrically heat sealable material of the component 12 is preferably plasticized polyvinly chloride. This material is very effectively heated by high frequency electromagnetic fields. For example, the power supplied by the generator for the method of this invention can be from 2 to 20 KW at a frequency at from 18 to 150 megahertz with 27.12 MHz having the advantage of compliance with FCC regulations and not requiring a screen room for shielding. This power is suitable for a laminate having a thickness of approximately 10–25 mils. The figures given herein are merely by way of illustration.

Other materials which are sealable and can be used for the outer component 12 include polyvinyl acetate; copolymers of vinyl chloride and vinyl acetate; copolymers of vinyl chloride and vinylidene chloride; copolymers of ethylene and vinyl acetate; polyamide (nylon); polyurethanes; homopolymers of polyvinylidene chloride; copolymers of vinylidene chloride and lesser amounts of other unsaturated compounds (Saran); and polyvinyl butyrate. The above materials can be used with plasticizers where appropriate.

For the lower component 14, other suitable materials besides polyethylene are: polytetrafluoroethylene (Teflon); copolymers of ethylene and propylene; polyesters such as polyethylene glycol terephthalate (Mylar); ionomer (Surlyn); and spun bonded polyolefins, such as "Tyvek" manufactured by DuPont of Wilmington, Delaware; and other non-woven plastic materials.

Figure 4:
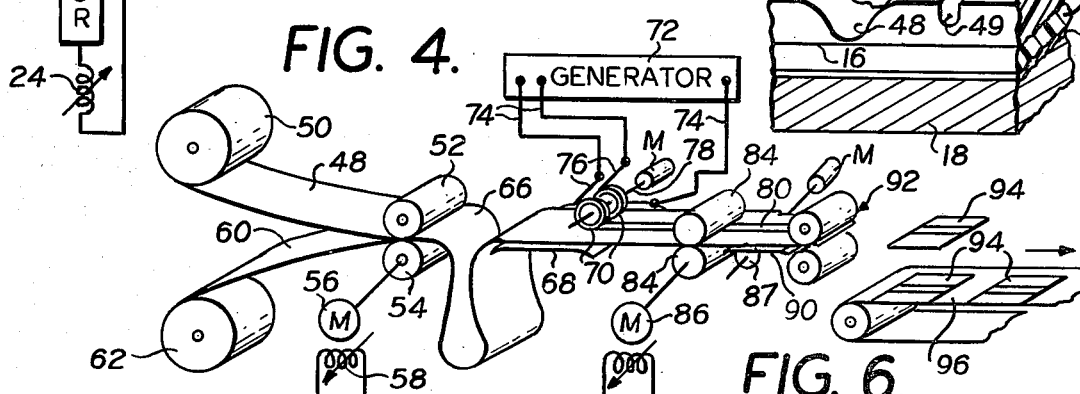
FIG. 4 is a diagrammatic view showing one way in which the laminate can be made and grooved and cut into book covers in a continuous operation.

FIG. 4 shows diagrammatically one way in which the method of this invention can be carried out as a continuous process. A web of plasticized polyvinyl chloride 48 can be unwrapped from a reel 50 by power driven feed rolls 52 and 54 operated from a motor 56 which has a speed responsive control 58. Another elongated web of polypropylene 60 can be unwound from a reel 62 by feeding the sheet 60 through the same roll pass of the rollers 52 and 54 as the sheet 48. The sheets 48 and 60 are bonded together in the pass between the rolls 52 and 54 by the application of heat and/or adhesive. The rolls 52 and 54 represent a bonding or laminating station and the actual bonding of the sheets 48 and 60 can be by any well-known means; the particular expedient forming no part of the present invention. The rolls 52 and 54 are merely representative of a station and step at which the sheets 48 and 60 are bonded to one another to form a laminate 66 which passes with continuous motion beyond the bonding station of the rolls 52 and 54 and through a cooling or equilibriumreaching zone which comprises the space between the rolls 52 and 54 and subsequent grooving wheels 70.

A support 68 corresponds to the support of FIG. 1 and serves as an electrode to which a high frequency generator 72 is connected by a conductor 74. A buffer such as the buffer 41 as shown in FIG. 1 is used to cover the support 68 but is not shown in the small scale of FIG. 4.

The grooving wheels 70 constitute the electrodes attached to the other side of the generator 72 by conductors 74 and brushes 76 that contact with the metal wheels 70.

These wheels 70 are supported on a shaft 78 and are spaced on the shaft by the distance desired for the hinge lines which extend lengthwise of the laminate 66. These hinge lines are indicated by the reference character 80 in FIG. 4.

The grooving wheels 70 operate in the same way as the tools 32 and 34 of FIG. 1 except that they have rolling pressure on the continuously moving laminate 66 and they do not have to move up and down with respect to the laminate because the supply of current to the grooving rolls 70 is continuous and the continuous heating within the RF responsive component 48 of the laminate permits the wheels to displace material to form the grooves 80 as the rolls turn in response to passage of the laminate 66 under the rolls.

Figures 5, 6:
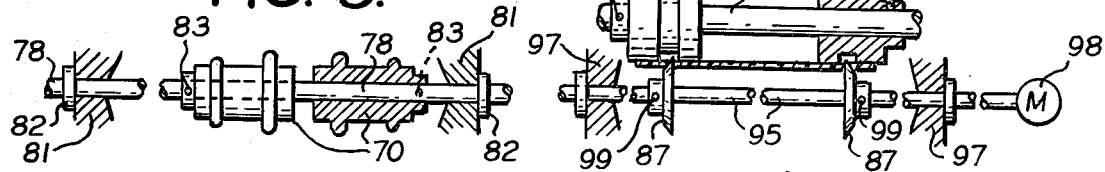
FIGS. 5 and 6 are enlarged views of the grooving and trimming means shown in FIG. 4.

The wheels 70 are adjustably spaced from one another axially by the desired distance between the hinge lines; the distance being somewhat exaggerated in FIG. 4 for clearer illustration. The shaft 78 rotates in bearings 81 (FIG. 5) and holds the wheels 70 against axial displacement by suitable thrust bearings 82, and there are set screws 83 in hubs of the wheels 70 for holding them in adjusted positions on the shaft 78. These set screws 83 are simplified representations of means for adjusting the spacing of the wheels 70 from one another.

The laminate 66 passes beyond the grooving wheels 70, which are shaped to the desired width and cross section of the hinge line grooves, and advances through another cooling zone on its way to feed rolls 84 driven by a variable speed motor 86. Beyond the feed rolls 84, the laminate 66 passes between edge trimmers 87 and then across a support 90 to a cut-off station 92 which is shown in FIG. 4 as a flying shear.

Individual covers 94, into which the laminate is cut, are discharged onto a conveyor 96 by which they are transported to a delivery station.

The edge trimmers 87 are rotating knife discs secured to a shaft 95 that is rotated in bearings 97 by an electric motor 98. The trimmers 87 are secured to the shaft 95 by set screws 99 which can be relaxed to adjust the spacing of the trimmers. As in the case of the grooving wheels of FIG. 5, these set screws are a simplified representation of means for adjusting the trimmers toward and from one another. Opposing grooves in rolls 100 adjustable along a shaft 101 are located on the side of the laminate 66 opposite the trimmers 87.

Figure 7:
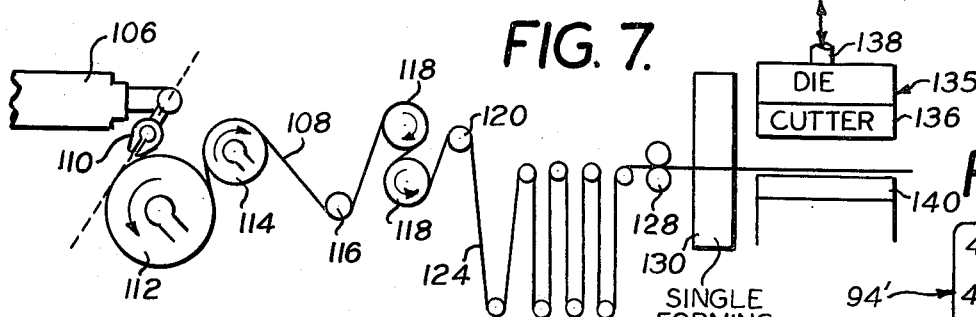
FIG. 7 is a diagrammatic view showing a modified method by which the laminate can be made.

FIG. 7 is a diagrammatic view of a modified form of the invention. An extruder 106 extrudes material for a two layer laminate 108 from an extrusion die 110, which is preferably a co-extrusion die that extrudes two layers of different kinds of plastic simultaneously onto a chill roll 112. Co-extrusion dies and the extrusion of plastic onto a chill roll are well-known in the art and no detailed explanation is necessary for a complete understanding of this invention.

It will be understood that the laminate 108 formed by extruding plastic onto the chill roll 112 is of the desired width for making book covers by modification of the method already described in connection with the previous figures.

The laminate 108 passes from the chill roll 112 around a water-cooled roll 114, and idler 116, and then around pull rolls 118, which are commonly made of rubber.

Beyond the pull rolls 118, the laminate 108 passes over an idler 120 at the top of a festoon 124, which serves as a slack accumulator. Beyond the festoon 124, the laminate 108 travels through other pull feed rolls 128, which are operated intermittently in the modification illustrated in FIG. 7.

Figure 3:
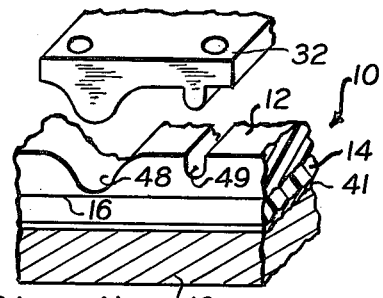

Beyond the feed rolls 128, the laminate 108 passes through a hinge forming station 130, where the hinge lines for the cover blanks are formed, preferably in accordance with the method illustrated in FIGS. 1–3. The hinge lines may be formed in the direction of the length of the laminate 108 or in a transverse direction, such as at right angles to the direction of the length of the laminate. Since the feed rolls 108 operate intermittently, the laminate is stationary at the time that the hinge lines are formed; and the direction in which the hinge lines extend depends upon which way the hinge forming tools are oriented with respect to the laminate in the hinge forming station 130.

Whether the hinge lines are formed lengthwise of the laminate or cross-wise may be determined by the orientation of the tear properties of the layer of the laminate which is to serve as the hinge, since the laminate is a material which may have oriented tear properties.

After each hinge forming operation at the hinge forming station 130, the feed rolls 128 advance the laminate by a distance somewhat in excess of the length or width of the book cover which is to be severed from the laminate at the cutting station 135. At this cutting station 135, there is a cutting die 136 which is moved up and down by mechanism indicated diagrammatically by the reference character 138. This mechanism 138 moves the cutter 136 toward and from a platen 140 across which the laminate moves intermittently.

The die cutter 136 is oriented in correlation to the orientation of the hinge forming tools in the hinge forming station 130 so as to cut a cover from the laminate with the hinge lines at a mid-region of the cover and with the hinge lines extending from the top to the bottom of the cover.

The cutter 136 may be a steel rule die and it can be constructed so as to cut the covers with round corners. The die 136 can use a combination of heat and pressure to cut covers from the laminate 108 while the laminate is stationary over the platen 140; or the cutter can be a mechanical cutter or operate with a combination of mechanical cutting and heat.

Figure 8A:
FIGS. 8 and 8a show book covers made in accordance with this invention and show the grooves that form the hinge lines.
Figures 8, 9, 10:
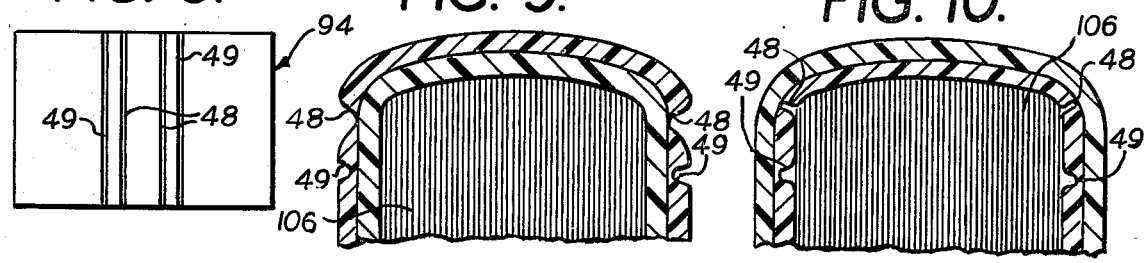
FIGS. 9 and 10 are diagrammatic, fragmentary, end views of books to which the cover of this invention is applied.

FIG. 8 shows a completed book cover in a flat condition before being applied to the filler of a book. FIG. 8a shows a cover similar to FIG. 8 but with rounded corners and with corresponding parts indicated by the same reference character as in FIG. 8 but with a prime appended.

FIGS. 9 and 10 show the cover of this invention applied to a book filler 106. In FIG. 9 the hinge line groove is on the outside of the cover; and in FIG. 10 the cover is applied to the filler with the hinge line groove on the inside of the cover. The preferred construction has the hinge line on the outside so that the decorative groove 49 is on the outside.

The preferred embodiment of the invention has been illustrated and described, but changes and modifications can be made and some features used in different combinations without departing from the invention as defined in the claims.

What is claimed is:

1. The method of making a plastic book cover, which method includes feeding into a zone between electrodes a plastic laminate comprising a first component layer of plastic, of a stiffness suitable for front and back panels of a cover for a book and that has the further characteristic of becoming highly heated and flowable locally between said electrodes when the electrodes are used to produce a high frequency dielectric field at said zone, said first layer being bonded to a second component layer of plastic having substantially more flexibility than the first layer and suitable for hinges of the cover and having the further characteristic that substantially less heat is generated in it by the same high frequency dielectric field that heats the first layer, heating the first component of the laminate, between said electrodes by the high frequency dielectric field, to a flowable condition, exerting pressure by one of the electrodes against the flowable material of the first component with sufficient pressure to displace permanently the flowable material to produce a groove in the first component while the second component has less heat generated therein by said dielectric field and remains below flowable temperature, and displacing said material of the first component along a hinge line of the cover made from the laminate.

2. The method described in claim 1 characterized by exerting pressure by the electrode against the laminate while the lesser heat generated in the second layer is inconsequential, and supporting the second layer from its surface that is opposite its interface with the first layer during the displacement of the flowable material of the first layer by said electrode.

3. The method described in claim 1 characterized by making a book cover from a laminate, one of the layers of which is a plastisol.

4. The method described in claim 1 characterized by using for the first layer a plastic material from the group consisting of polyvinyl chloride; copolymers of vinyl chloride and vinylidene chloride; copolymers of vinyl chloride and vinyl acetate; polyamide (nylon); polyurethanes; homopolymers of polyvinylidene chloride; copolymers of vinylidene chloride and lesser amounts of other unsaturated compounds (Saran); and polyvinyl butyrate, and by using for the second layer a plastic from the group consisting of polypropylene; fluoroplastics; polytetrafluoroethylene (Teflon); copolymers of ethylene and propylene; polyesters such as polyethylene glycol terephthalate (Mylar); ionomer (Surlyn); and spun bonded polyolefins and other non-woven plastic materials.

5. The method described in claim 1 characterized by making the second layer out of material that is more flexible than the regions of the first layer other than the areas where material is displaced from the first layer to form the hinge lines.

6. The method described in claim 1 characterized by contacting the second layer of laminate with a buffer-covered electrode on one side of the high frequency electrode power supply, locating an electrode, that is connected to the other side of the electric power supply, close to the surface of the first layer, and supplying power to the electrodes after bringing one of them into contact with the first layer and pressing the electrode into the first layer until said electrode penetrates substantially to the interface between the two layers along the hinge line of the book cover.

7. The method described in claim 6 characterized by heating the laminate along areas that correspond with both of the hinge lines of a book cover, and displacing flowable material from the areas of two parallel hinge lines simultaneously on the side of the laminate that is made of the material that is heated to a flowable condition by the high frequency dielectric field.

8. The method described in claim 1 characterized by depressing material from the hinge line, for the full length of the desired hinge line by an electrode of the desired cross section of the depressed groove that provides the hinge line, and withdrawing the electrode from the material with the temperature of the material cool enough to prevent any substantial flowing back of material into the groove, whereby the entire length of the hinge line is made in one operation.

9. The method described in claim 8 characterized by heating the material of the first layer to a temperature at which it is flowable under pressure from the electrode, limiting the heating to a temperature that leaves the viscosity of the displaced flowable material high enough to avoid flow back by gravity into the depressed hinge line when the pressure of the electrode is removed, and withdrawing the electrode from the laminate immediately after penetration into the material to the desired hinge depth and without waiting for complete cooling of the laminate.

10. The method described in claim 1 characterized by closing the circuit of the high frequency dielectric field after pressing the electrode into contact with the first layer of laminate whereby the first layer is heated, and opening the circuit of the high frequency dielectric field after a predetermined heating period.

11. The method described in claim 10 characterized by adjusting the supply of high frequency electric power for the desired frequency, and using an automatic control for the heating period to insure uniform hinge lines for any selected frequency of power supply.

12. The method described in claim 1 characterized by forming the laminate as a continuous element with the layers bonded together at their interface, applying the high frequency dielectric field to the laminate to heat the first layer as the laminate advances with continuous motion, applying rolling pressure to the first layer with a wheel that has the desired width and cross section of the hinge line, and cutting the continuous laminate to form book covers.

13. The method described in claim 12 characterized by the laminate being formed by bringing together with continuous motion long sheets of material for the respective first and second layers, bonding the sheets together at their areas of contact as they advance with continuous motion, passing the bonded sheets through an accumulation zone, then applying the high frequency electric field to the laminate, providing a width of laminate at least as wide as the width of an open book cover which is to be made from the laminate, passing the laminate continuously through the region of heating and then through a cooling zone, trimming the laminate progressively to the width of the book cover, and cutting lengths from the laminate to form book covers as the laminate travels beyond the cooling zone and beyond the region of trimming.

14. The method described in claim 12 characterized by making the laminate by applying one layer to the other layer, while both layers are hot enough to fusion bond to one another.

* * * * *